C. I. HALL.
ELECTRICAL INSTRUMENT.
APPLICATION FILED SEPT. 14, 1914.

1,190,157.  Patented July 4, 1916.

Witnesses:

Inventor:
Chester I. Hall,
by His Attorney.

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

ELECTRICAL INSTRUMENT.

1,190,157.   Specification of Letters Patent.   Patented July 4, 1916.

Application filed September 14, 1914. Serial No. 861,640.

*To all whom it may concern:*

Be it known that I, CHESTER I. HALL, a citizen of the United States, residing at Fort Wayne, county of Allen, State of Indiana, have invented certain new and useful Improvements in Electrical Instruments, of which the following is a specification.

My invention relates to electrical instruments and more particularly to electric current measuring instruments, and especially to electric current demand indicators for measuring and recording the demand, and particularly the maximum demand, of an electrical installation.

The object of my invention is to provide a novel and improved construction of electrical instrument, and particularly of an electric current measuring instrument.

More particularly, the object of my invention is to provide a novel and improved construction of electric current demand indicator.

A further object of my invention is to provide a simple, inexpensive, reliable and satisfactory demand indicator for measuring and recording the demand, and particularly the maximum demand, of an electrical installation.

Other objects of my invention will be evident to those skilled in the art from the following description and the appended claims.

The features of my invention which I believe to be patentably novel are definitely indicated in the claims appended hereto.

Figure 1:
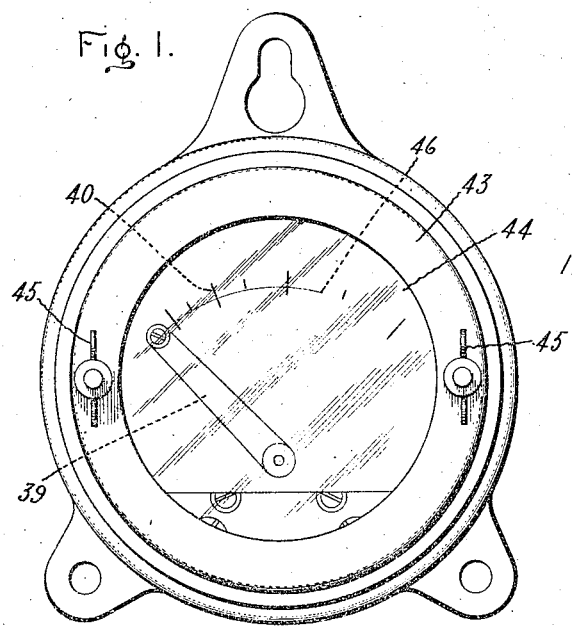
Figure 2:
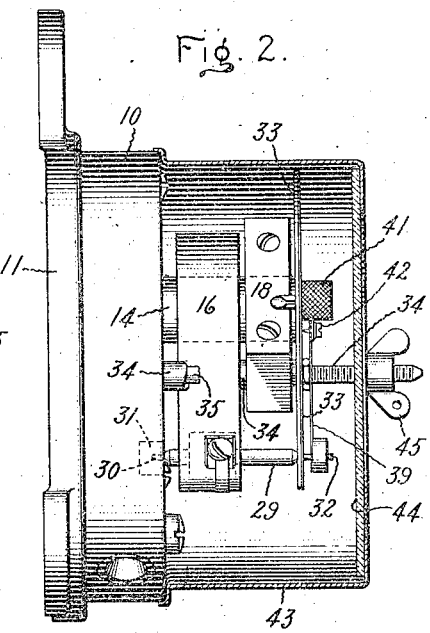
Figure 3:
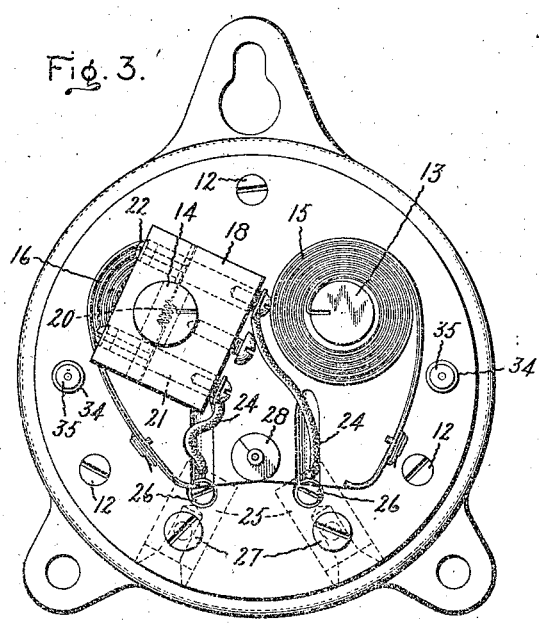
Figure 4:
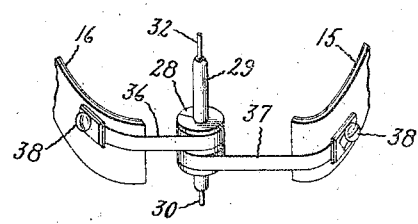
Figure 5:
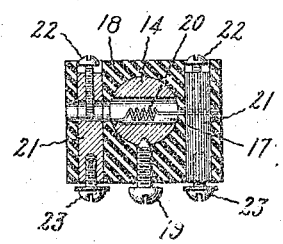

The construction and mode of operation of an electric current measuring instrument embodying my invention will be understood from the following description taken in connection with the accompanying drawings, in which:

Figure 1 is a top plan view of an electric current measuring instrument embodying the novel features of my invention; Fig. 2 is a side elevation of the instrument with the cover in section; Fig. 3 is a top plan view of the instrument with the cover, scale plate and indicating pointer removed; and Figs. 4 and 5 are detail views of certain features of the construction.

The instrument of my present invention depends for its action upon the heating effect of an electric current. The instrument in its complete form comprises two temperature responsive members arranged to exert opposing actions or forces upon an indicating element and means for subjecting one of such members to the heating effect of an electric current. The movement of the indicating element is thus a measure of the difference in temperatures to which the two temperature responsive members are subjected. In order to give the instrument the desired time interval or time lag, a heat-storage member is provided in connection with the temperature responsive member subjected to the heating effect of the electric current, and such temperature responsive member preferably surrounds the heat-storage member so that heat is radiated from the heat-storage member through the temperature responsive member. The temperature responsive member preferably consists of two strips of dissimilar metals, having different coefficients of expansion, welded together. Such composite duplex metal is well known as thermostatic metal. I prefer further to give the temperature responsive member, made of such thermostatic metal, the form of a spiral spring, which varies in tension under changes in temperature.

My invention will be best understood by reference to the accompanying drawings.

The operative elements of the instrument are mounted upon a supporting base 10 of electrical and heat insulating material, which in turn is securely molded upon, or otherwise suitably secured in any convenient manner to the cast metal back 11. Three screws 12 serve to assure a secure fastening of the base 10 to the back 11. Two metal posts or studs 13 and 14 are securely embedded in and extend from the supporting base 10. A bi-metallic thermostatic member 15, in the form of a spiral spring, has one end secured to the stud 13 and its convolutions surround the stud, as clearly shown in Fig. 3 of the drawings. A second bi-metallic member 16, also in the form of a spiral spring, is attached to and surrounds the stud 14. The stud 14 is longer than the stud 13 and has a portion extending above the thermostatic member 16. As will be explained in detail hereinafter, the stud 14 is adapted to serve as a heat-storage member and to direct the flow of heat contained therein principally through the convolutions of the thermostatic member 16.

The extending-portion of the stud 14 is provided with a hole 17, and is surrounded by a rectangular block 18 of heat insulating material. The block 18 is adapted to be secured to the stud 14 by a set screw 19. An electric current heating element, such as a coil 20 of resistance wire, is arranged within the hole 17 and has its end secured to metallic pins 21 by binding screws 22. The pins 21 are fastened in the block 18 and are provided with screws 23 for securing conductors 24 thereto. The other ends of the conductors 24 are secured to terminals 25 of the instrument by means of screws 26. Screws 27 are adapted to secure leading-in conductors to the instrument terminals 25 in the well known manner.

A cylindrical member or drum 28 is secured to a pivotally mounted shaft 29. The lower end of this shaft has a pivot pin 30 which coöperates with a metallic pivot 31, while the upper end has a pivot pin 32 which extends through an aperture in a scale plate 33. The scale plate rests upon two sleeves 34 each surrounding a post 35 embedded in the supporting base 10. Flexible connections, such as the metallic ribbons 36 and 37, operatively connect the free ends of the thermostatic spring members 15 and 16 to the drum 28. Reference to Fig. 4 of the drawings will clearly show the connection of one end of the metallic ribbon 36 to the drum 28 and the connection of the other end of this ribbon to the free end of the thermostatic member 16 by means of a screw 38. Similarly, the metallic ribbon 37 is connected at one end by the screw 38 to the thermostatic member 15 and at the other end to the drum 28. An increase in the temperature influencing the thermostatic member 16 tends to turn the drum clockwise, while an increase in the temperature influencing the thermostatic member 15 tends to turn the drum counter-clockwise. The two thermostatic members are thus arranged to exert opposing actions on the drum.

An indicating element, such as a pointer 39, is secured to the upper pivot 32 of the shaft 29, and constitutes the movable element of the instrument. This pointer is arranged to sweep across a suitable scale 40 imparted on a removable record sheet attached to the scale plate 33. The record sheet may be of any suitable material and is attached to the scale plate by pins 41. I prefer to employ a specially prepared paper for the record sheet which is designed to have a black mark imparted thereon by a metallic stylus. The pointer 39 is, accordingly, provided with a marking stylus 42 of brass or similar suitable metal. A cover 43 having a circular glass window 44 is adapted to be secured to the base 10 by means of the posts 35 and wing nuts 45.

It will be seen from the foregoing description that my novel and improved electric current measuring instrument is of the simplest possible construction, containing but very few parts. The entire working mechanism consists of two spiral thermostatic springs, acting upon a drum carried by the staff of a marking stylus. The two spiral springs are made of a special duplex metal, which, under changes of heat, vary in tension. The heating element is contained within the stud upon which is mounted one of the spiral thermostatic springs. The time element of the instrument is derived through both the storage of heat in the longer stud 14 and the flow of heat from this stud through the various convolutions of the thermostatic member 16. A concrete example will make the operation of the instrument clear. Assume the instrument to be connected in circuit with no current flowing. Both thermostatic springs will have exactly the same tension, and, since they are acting in opposition to each other, will maintain the marking stylus or indicating element at the zero position. Assume now that load of three amperes is thrown upon the instrument. The heating element, which is electrically insulated from the remainder of the instrument, will immediately rise to a temperature proportional to this current and will begin to radiate heat to the metallic stud 14 within which it is mounted and from which it is electrically insulated, and thence to the thermostatic spring 16. It will, of course, require considerable time for the comparatively small input of heat to bring the stud up to the temperature corresponding to this particular input. This constitutes one part of the time element of the instrument. Since only one end of the spiral thermostatic spring member 16, is connected to the stud 14, it is necessary for the entire spring to be heated from this point and the heat will flow gradually from the point of connection between these two members to the free end of the thermostatic member. This constitutes the second part of the time element of the instrument. As the heat gradually flows into the spiral thermostatic spring member 16 and raises its temperature the tension of this member is materially increased. Since this tension is opposed by a separate thermostatic spring 15, which will have at all times the same initial tension as the heated thermostatic spring 16, a movement of the indicating element will take place until an exact balance is reached, that is to say, the heated thermostatic spring having greater force will wind up the cool thermostatic spring until the tensions of the two springs are exactly equal. This operation will continue as the heated thermostatic spring becomes warmer and warmer until finally the maximum temperature, determined by the ratio of heat-input and radiation, is reached.

At this point motion of the two thermostatic springs, and hence of the indicating element, will cease. If now the current is shut off, heat will be radiated from the entire device at a rate proportional to the area exposed to the atmosphere. This area is so proportioned that the time of cooling is equal to the time required for reaching a normal and constant temperature under the influence of any load. Due to the fact that the times required for the indicating element to rise to its final position under any load and to fall to its initial position are substantially equal, the device gives a very satisfactory indication of demand on varying loads.

The heat-storage and heat-flow features of my novel and improved instrument are decidedly advantageous and particularly important. As far as I am aware, all instruments of this general type have heretofore been so constructed that the characteristic curve of deflection rises rapidly at first, and then requires a considerable length of time to rise the remaining relatively small interval to a final deflection for a particular load. The curve of deflection is plotted with time as abscissæ and deflection as ordinates. With such present instruments, when an abnormal demand is being measured the deflection rises very quickly, and in a relatively short time has attained a very considerable percentage of the final deflection. This means that a consumer is unduly penalized for demands of short duration. The curve of deflection of my improved instrument approximates a straight line, due to the heat-storage in the stud 14 and to the heat-flow through the convolutions of the thermostatic spring 16. The storage of heat in the stud 14 necessitates the existence of the demand for a certain time before its effects are felt by the thermostatic spring 16, and the flow of heat from the inside of the spring through the outer convolutions further provides a time-lag which operates to straighten out the instrument's curve of deflection. This action is important, since it gives a very much more equitable demand indication than is obtained by instruments of this type now in use.

It is possible with the indicator of my invention, due to the fact that the moving element has very high torque, to obtain a permanent record of the maximum demand. The torque tending to turn the drum 28 clockwise and developed in the thermostatic member 16 is considerable and entirely sufficient to overcome the friction between the marking stylus 42 and the record sheet. The record thus consists of a line 46 drawn by the brass stylus 42 upon a record sheet of specially prepared paper. The line 46 extends from the zero or initial position of the marking stylus to the maximum position attained during the interval of operation of the instrument. Thus a record is obtained which may be filed for future reference and which eliminates the possibility of dispute between the central station and the consumer. At the end of the month or other suitable period of reading, the old record sheet is removed and a new one substituted.

The scale calibration of the instrument is particularly desirable since it follows the law of heating in a conductor and is proportional to the square of the current. This suppresses the lower portion of the scale, which is of little or no value in a maximum indicator, and enlarges the upper portion of the scale where a record of the demand is desired. The instrument, being essentially a current measuring instrument, may be used either on alternating or direct current circuits, but it will be evident that it does not take account of voltage or power factor variation. In this connection it will be evident that the instrument has no all-day loss, such as occurs in watthour meters.

It will be noted from the accompanying drawings and the foregoing description that the instrument of my invention is particularly accessible and easily handled and repaired. The heating element is carried in the heat insulating block 18 and is held in place by the contact screws 22. The calibration of the instrument may thus be conveniently changed by installing another heating element of a different diameter of wire, and, further, burned-out and damaged heating elements may be readily replaced. A particular advantage of the instrument's construction is the extreme simplicity of its operating mechanism, whereby reliable and satisfactory operation is insured. The calibration of the instrument is substantially permanent, and readings are not subject to errors due to fluctuations in variables, such as temperature, frequency, etc.

I have explained my invention by illustrating and describing a certain specific embodiment thereof, but it will be readily understood by those skilled in the art that the invention may be embodied in many other forms than that shown and described. I, accordingly, do not wish to be restricted to the particular form or construction disclosed herein by way of example for the purpose of setting forth my invention in accordance with the patent statutes. The terms of the appended claims, are, therefore, not restricted to the precise structure disclosed, but are intended to cover all changes and modifications within the spirit and scope of my invention.

What I claim as new and desire to secure by Letters Patent of the United States is:—

1. An electrical instrument comprising a heat-storage mass, an electric current heating element arranged within said mass, a thermostatic spiral member arranged around said mass and having one end in thermal connection with the mass, and an indicating element operatively related to said thermostatic member.

2. An electrical instrument comprising a heat-storage mass, a thermostatic spiral spring member arranged around said mass and having one end in thermal connection with the mass, means for subjecting said heat-storage mass to the heating effect of an electric current, and an indicating element operatively related to said thermostatic member.

3. An electrical instrument comprising a movable element, two bi-metallic thermostatic spiral spring members adapted to exert opposing actions upon said element, a heat-storage mass, and means for subjecting said mass to the heating effect of an electric current, one of said thermostatic members being thermally related to said heat-storage mass so that heat from the mass flows into one end thereof and thence through the convolutions thereof.

4. An electrical instrument comprising a movable element, two thermostatic members adapted to exert opposing actions upon said element, a heat-storage mass, means for subjecting said mass to the heating effect of an electric current, one of said thermostatic members being thermally related to said heat-storage mass so that heat from the mass flows into one end thereof and reaches other parts by conduction so that a significant time interval elapses before the member completely responds to a change in the heat stored in said mass.

5. An electrical instrument comprising a heat-storage mass, a thermostatic member having one end in thermal connection with said mass so that heat from the mass enters said member at this end and passes to other parts thereof by conduction, means for subjecting said heat-storage mass to the heating effect of an electric current, and an indicating element operatively related to said thermostatic member.

6. An electrical measuring instrument comprising a heat-storage mass, means for subjecting said mass to the heating effect of an electric current, an elongated temperature responsive member thermally connected at one end to said mass so that heat from the mass enters the member at this end and reaches other parts thereof by conduction whereby a significant time interval elapses before the member completely responds to a change in the heat stored in said mass, and an indicating element operatively related to said temperature responsive member.

7. An electrical measuring instrument comprising a metallic post, an electric current heating element arranged within said post, a thermostatic spring member arranged around said post, and an indicating element operatively related to said thermostatic member.

8. An electrical measuring instrument comprising a metallic post, an electric current heating element arranged within said post, a thermostatic spring member arranged around said post, means whereby the radiation of heat from said post is directed principally to said thermostatic member, and an indicating element operatively related to said thermostatic member.

9. An electrical measuring instrument comprising an indicating element, two thermostatic spring members adapted to exert opposing actions on said element, a metallic post concentrically arranged within one of said members, and an electric current heating element arranged within said post.

10. An electrical instrument comprising an electric current heating element, a heat-storage member adapted to receive heat developed by the flow of current in said heating element, a thermostatic spiral spring member thermally connected at one end to said heat-storage member so that heat from said heat-storage mass flows by conduction from this end of the thermostatic spiral spring member through the convolutions thereof, a second thermostatic spiral spring member substantially unaffected by the heat developed by the flow of current in said heating element, a movable element, and means whereby said two thermostatic spring members exert opposing actions upon said movable element.

11. An electrical instrument comprising a metallic heat-storage member, a thermostatic spiral spring member surrounding said heat-storage member, a block of heat insulating material adapted to assist in directing radiation of heat from said heat-storage member through said thermostatic storage member, an electric current heating element member, mounted in said block and extending through said heat-storage member, and a movable element operatively related to said thermostatic member.

12. An electrical instrument comprising a metallic heat-storage member, a thermostatic spiral spring member surrounding said heat-storage member, a block of heat insulating material adapted to assist in directing radiation of heat from said heat-storage member through said thermostatic member, an electric current heating element mounted in said block and extending through said heat-storage member, a second thermostatic spiral spring member substantially unaffected by the heat stored in said heat-storage member, a movable element, and means whereby said two thermostatic members exert opposing actions upon said movable element.

13. An electrical measuring instrument comprising an indicating element, two thermostatic spring members adapted to exert opposing actions on said element, a metallic post concentrically arranged within one of said members, an electric current heating element arranged within said post, and means whereby the radiation of heat from said post is directed principally through the thermostatic member within which it is arranged.

14. An electrical measuring instrument comprising an indicating element, two thermostatic spring members adapted to exert opposing actions on said element, a metallic post concentrically arranged within one of said members and having a portion extending above such member, an electric current heating element arranged within said post, and a member of heat insulating material surrounding the extending-portion of said post.

15. An electric current demand indicator comprising a pivotally mounted cylindrical member, indicating means operatively connected to said cylindrical member, two flexible connections operatively connected to said cylindrical member, a bi-metallic thermostatic spiral spring member connected to each of said flexible connections, said thermostatic spring members being arranged to exert opposing actions on said cylindrical member, a metallic post concentrically arranged within one of said thermostatic members and having a portion extending above such member, an electric current heating element arranged within said post, and a block of heat insulating material surrounding the extending-portion of said post.

In witness whereof, I have hereunto set my hand this tenth day of September, 1914.

CHESTER I. HALL.

Witnesses:
RAL MÜLLER,
JNO. H. LOTZ, Jr.